United States Patent [19]

Smith

[11] Patent Number: 5,124,941
[45] Date of Patent: Jun. 23, 1992

[54] BIT-SERIAL MULTIPLIERS HAVING LOW LATENCY AND HIGH THROUGHPUT

[75] Inventor: Stewart G. Smith, Valbonne, France

[73] Assignee: VLSI Technology Inc., San Jose, Calif.

[21] Appl. No.: 609,307

[22] Filed: Nov. 1, 1990

[51] Int. Cl.$^5$ .................................. G06F 7/52
[52] U.S. Cl. .................................. 364/759
[58] Field of Search ............. 364/757–759, 364/754

[56] References Cited

U.S. PATENT DOCUMENTS

| | | | |
|---|---|---|---|
| 3,582,634 | 6/1971 | Bartlett | 364/759 |
| 3,610,907 | 10/1971 | Taylor | 364/759 |
| 3,617,723 | 11/1971 | Melvin | 364/759 |
| 3,737,638 | 6/1973 | Esteban | 364/759 |
| 3,805,043 | 4/1974 | Clary | 364/758 |

OTHER PUBLICATIONS

Smith and Denyer, *Serial Data Computation*, Kluwer Academic Press, 1988, pp. 72–90.

Primary Examiner—Tan V. Mai
Attorney, Agent, or Firm—Bowles Horton

[57] ABSTRACT

A fractional bit-serial multiplier includes an array of partial product generators, an array of carry-save and accumulate stages and a spill-pipe to accommodate word growth and provide the higher order product terms. Circuitry between the carry-save stages and the spill pipe is provided to give the final partial products correct weighting and to avoid use of circuitry between the partial product generators and the carry-save stages.

6 Claims, 4 Drawing Sheets

BIT-SERIAL MULTIPLIERS HAVING LOW LATENCY AND HIGH THROUGHPUT

FIELD OF THE INVENTION

The invention relates to serial-data multipliers as employed in digital signal processing and in particular to bit-serial multipliers, namely digital multipliers in which a data word is broadcast in serial form, the least significant bit being broadcast first, partial products being formed by gating the bits of the data word with a 'resident' bit of the coefficient word in each stage, and the partial products being shift-accumulated to enable the product of the data word and the coefficient word to be computed.

BACKGROUND TO THE INVENTION

Bit-serial multipliers in various forms are discussed in detail by Smith and Denyer, 'Serial-Data Computation', Kluwer Academic Press, and particularly at pages 72 to 90. As discussed therein, serial-data multipliers have two principal architectures represented by the serial-pipeline multiplier, often called the Lyon multiplier, and the serial-parallel multiplier. The Lyon multiplier generally requires a greater area than the serial-parallel multiplier and although it exhibits somewhat better throughput, it exhibits a greater latency: in this context latency refers to the time between the appearance of the least-significant bit (LSB) at the input and the appearance of the LSB at the output. Two forms of serial-parallel multiplier exist: the flush multiplier, wherein the product bits are flushed out of a carry-save array in serial fashion, and the fractional multiplier, wherein the lower-order product bits are obtainable from a carry-save array and the higher order bits are provided by a residue adder including a parallel-in serial-out (PISO) pipe. The flush multiplier is simpler, but requires (m−1) guard bits in the data word, where m is the number of bits in the coefficient word. A fractional multiplier does not require such guard bits but requires additional circuitry between the partial product generators and the carry-save array to cope with the negative weight of the most-significant bit in twos-complement arithmetic. This additional circuitry renders the fractional serial/-parallel multiplier significantly slower than the flush multiplier. This is important generally, but particularly so in digital signal processing involving short high-speed computational loops such as in recursive filters. However, it would be desirable to avoid both the use of guard bits and the disadvantages of additional circuitry in fractional serial/parallel multipliers.

SUMMARY OF THE INVENTION

It is accordingly one object of the invention to provide an improved serial-data multiplier and particularly an improved fractional, serial/parallel multiplier.

A further object of the invention is to provide an improved means of handling the most significant bit products in serial-parallel multiplication.

A yet further object of the invention is to eliminate unnecessary circuitry in fractional bit-serial multipliers. Other objects and advantages of the invention will become apparent from the following detailed description of preferred embodiments of the invention.

DETAILED DESCRIPTION OF THE INVENTION

Figure 1:
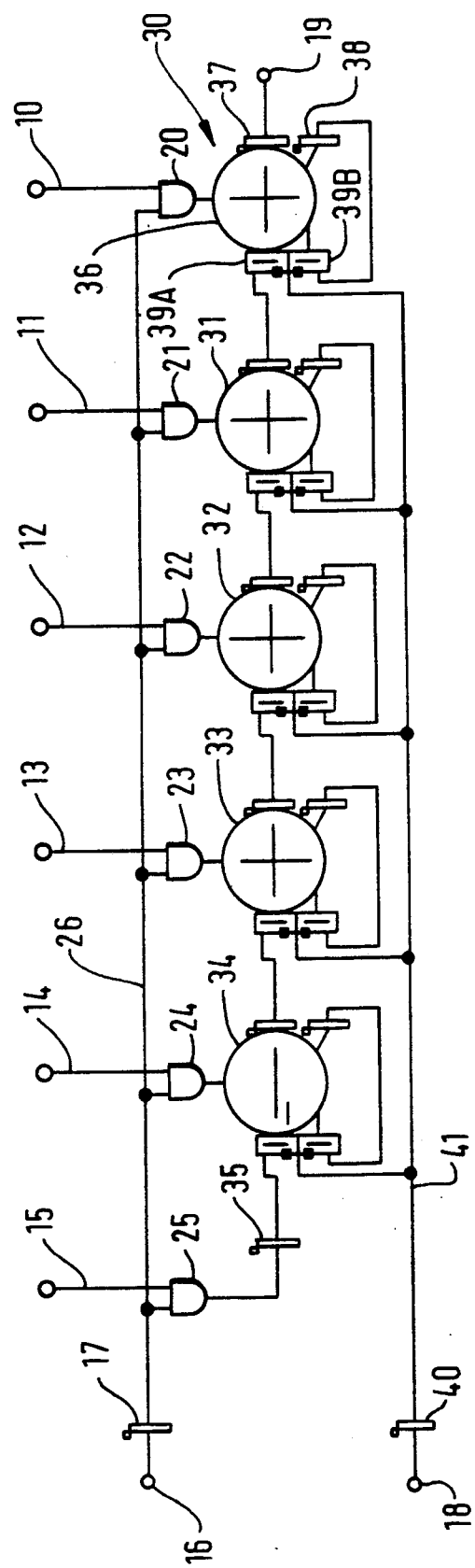
FIG. 1 illustrates schematically a known flush bit-serial multiplier.

To provide a clear understanding of the nature of the invention, it is convenient to describe briefly the construction and significance of known flush and fractional multipliers. Parts common to the various figures are denoted by like reference numerals.

FIG. 1 is a schematic illustration of a serial/parallel flush multiplier wherein m, the number of coefficient bits, is equal to six and the data word is broadcast one bit at a time. The bits of the coefficient word are available on lines 10 to 15. Normally these bits are held for the duration of the calculation in a register (not shown). The data word which is to be multiplied by the coefficient word is received serially at a data terminal 16.

It is convenient though not essential to latch and buffer broadcast signals and accordingly a D-type flip-flop 17 (shown, as all others in the figures, as a vertical bar) is interposed between the data terminal 16 and a data line 26. The D-type flip-flops are called simply flip-flops herein.

The partial products of the coefficient bits and the data bits are formed by gating: for this purpose the AND gates 20 to 25 are coupled each to the data line and to a respective one of the coefficient bit lines 10 to 15.

The computational part of the multiplier is a linear array of carry-save adders. Each stage 30 to 35 in the array functions to form the sum of the local partial product (from the respective AND gate) to the accumulated partial product such (if any) and pass the sum to the next stage. Each of the stages 30 to 33 are similarly arranged, so that it is sufficient to describe the most downstream stage 30 in detail.

The stage 30 comprises a latched full adder, i.e. a full adder 36 having a sum output which is latched by a flip-flop 37 and a carry output which is latched by a flip-flop 38. The adder 36 has A and B inputs which are each controlled by a respective multiplexer 39A and 39B. The multiplexer 39A has one input coupled to the output of the preceding stage and one 'free' input, whereas the multiplexer 39A has one input connected to the carry output of the same stage and one 'free' input. The multiplexers are each controlled by an LSB control line 41, which is coupled by way of a flip-flop 40 to an LSB input terminal 18. The LSB control is received at terminal 18 at the same time as the LSB of the data word arrives at the data terminal 16 and flip-flop 40 is provided to match the flip-flop 17. The multiplexers 39A and 39B are controlled to select the 'free' inputs at LSB time only. Thus the local carry loop and the A input of the adder are cleared at LSB time. These and the other multiplexers shown in the Figures follow the convention that the input nearer the control line is selected when the control line is active and the input further from the control line is selected otherwise.

The stage 35 consists of a flip-flop because this stage is the most upstream stage and there is no partial product sum to be added to the partial product from gate 25. The flip-flop is required to correctly align that partial product.

The stage 34 is similar to the downstream stages but is configured as a subtractor because the partial products of the coefficient MSB have negative weight.

The flush multiplier has no need of special hardware to handle the final partial product of the data-MSB. The product bits are flushed serially from the output 19 of the stage 30 and even though the final partial product (of the most significant bit of the data word and the coefficient word) is added rather than subtracted, the correct product bits have appeared by the time any sign error is made.

The flush multiplier shown in FIG. 1 requires guard bits at the top of the data word. These are required to accommodate word growth. If the data word has n bits of data and the coefficient word has m bits, the full product may be $(n+m-1)$ bits long, and so, $(m-1)$ guard bits, i.e. $(m-1)$ identical bits, are needed. This adversely affects throughput (i.e. words per second). The loss of throughput may be tolerated in some applications but where such loss is not desirable, the use of a fractional multiplier is preferable.

The fractional bit-serial multiplier shown in FIG. 2 has, as described with reference to the flush multiplier, a coefficient bit lines 10 to 15, a data input terminal 16, flip-flop 17, data line 26, partial product generators 20 to 25 and a carry-save array comprising the stages 30 to 35. Partial products are formed as previously described and the stages add the partial products to the accumulated partial product sum.

The bit-serial adder contained in each stage does not complete the calculation: it passes its final carry, i.e. the most significant carry-in of the full serial partial product—partial-product sum calculation, to the next stage. This carry signal is combined in an extra residue adder with the final sum output from the upstream stage adder. Several configurations for the residue adder are possible. One is a serial-data adder fed by a parallel-in serial-out (PISO) spill-pipe, as shown in FIG. 2. The bottom $(n-1)$ bits of the product are available from the output of the carry-save array whereas the top m bits are output from the residue adder. Reference may be made to Smith & Denyer (op. cit.) for a further discussion on how the fractional outputs of the multiplier may be handled according to the precision required in the final output. Further examples of fractional bit-serial multipliers and a discussion of word growth are given in U.S. patent application Ser. No. 425634 filed Oct. 23, 1989 in the names Stewart G Smith et al and assigned to the assignee of the present application.

In order to accomplish correct weighting, unsigned integer arithmetic must performed throughout, and to avoid inconsistent interpretation of the twos-complement serial partial product MSB, the known fractional multiplier employs inversion of the MSB, so that computation may proceed as if the adder inputs were unsigned. All carry signals are recombined with equivalently weighted sum signals in the residue adder, except for that generated by the MS-serial partial production calculation, which may be discarded.

The MSB inversion process requires a second control signal in synchronism with the data-MSB. The LSB control may be derived from such a control by way of a bit-delay, achieved by means of an extra flip-flop.

Reference may now be may again to FIG. 2, which illustrates a fractional bit-serial multiplier as discussed above. The inversion of the MSB bits is achieved by means of the exclusive-OR (XOR) gates 51 to 55 coupled between the partial product generators 21 to 25 and the stages 31 to 35 respectively. The treatment of the coefficient LSB will be described later. Each XOR gate has a first input connected to the output of the respective partial product generator (i.e. the respective AND gate) and to an MSB control line 56 which is fed by way of a flip-flop 57 from an MSB control terminal 58. As mentioned above, LSB control is derived from the MSB control line by way of flip-flop 40 coupled to the line 56 and providing an LSB control on line 41.

The residue adder 59 of previous mention is constituted by a gated full adder 60 and a PISO pipe comprising stages 61 to 64 each consisting of two latched multiplexers. The residue adder provides an output of the higher order product terms from terminal 67.

The XOR gate which would otherwise be between AND gate 20 and the stage 30 is omitted and inverter 65 and flip-flop 66 couple the (inverted) output of AND gate 20 to the adder 60. This provides the incrementing of the LSB as required for negation in twos-complement arithmetic.

The throughput of the fractional multiplier is significantly greater than that of a corresponding flush multiplier, by means of the elimination of guard bits. The spill-pipe need not extend all the way back along the array, but for simplicity it will be assumed that it does, with a maximum reduction in guard bits and a maximum increase in throughput. As noted above, the XOR gates represent additional circuitry between the partial product generators and the computational stages of the multiplier, and so the fractional multiplier is significantly slower (in terms of combinatorial delay) than the flush multiplier.

Figure 2:
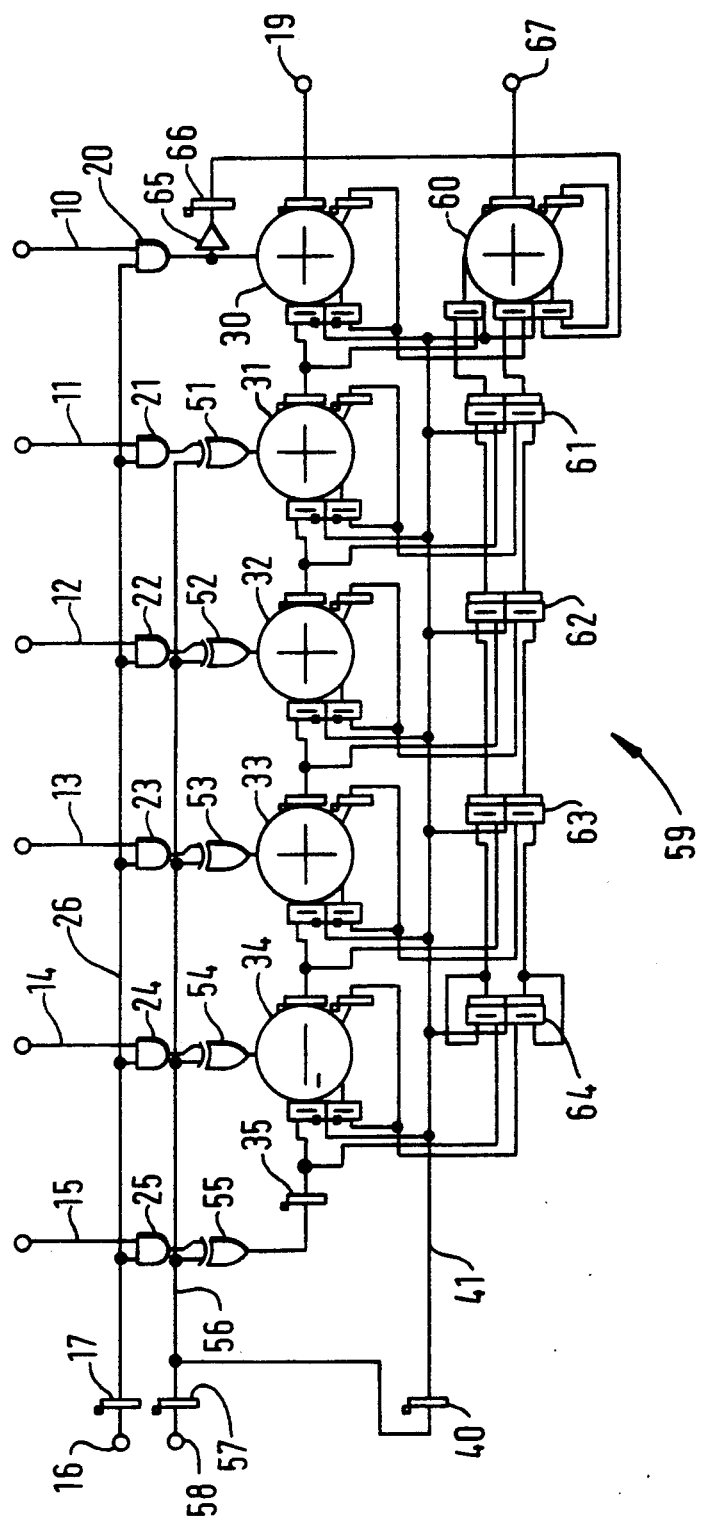
FIG. 2 illustrates schematically a known form of fractional bit-serial multiplier.
Figure 3:
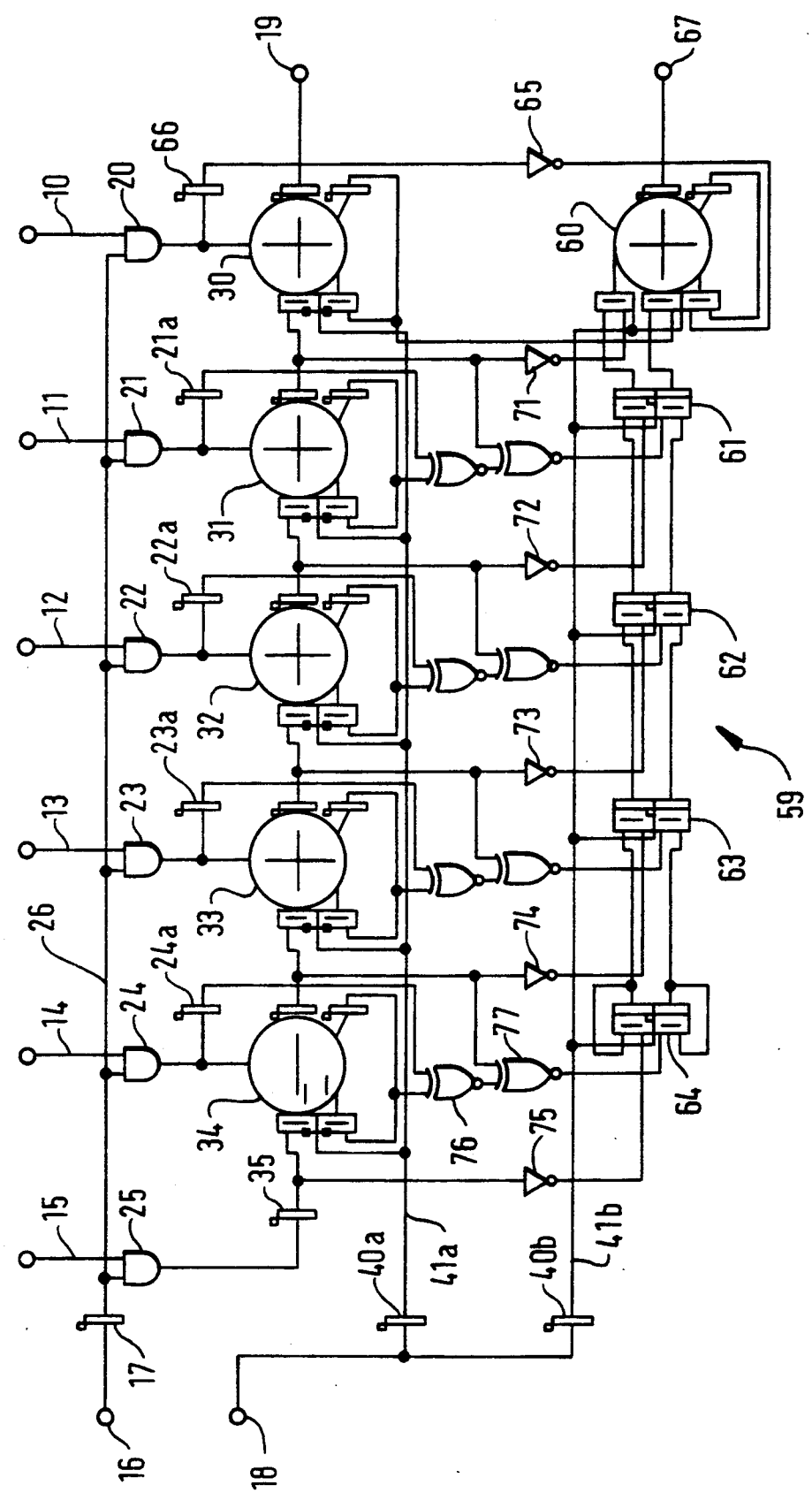
FIG. 3 illustrates schematically one embodiment of a fractional bit-serial multiplier according to the invention.

Reference may now be made to FIG. 3, which represents one embodiment of the invention. The fractional multiplier shown in FIG. 3 comprises, in common with the fractional multiplier of FIG. 2, coefficient lines 10 to 15, a data input terminal 16 which is connected by the flip-flop 17 to the data line 26, partial product generators 20 to 25 each connected to the data line and to a respective coefficient line, a carry-save array comprising stages 30 to 35 and a residue adder 59 comprising the PISO spill-pipe and the latched final adder 60, all generally arranged as previously described.

For reasons which will be apparent, an MSB control is not required. An LSB control terminal 18 is connected by way of respective flip-flops 40a and 40b to LSB control lines 41a and 41b, which control the multiplexers in the computational stages and the residue adder.

The multiplier shown in FIG. 3 omits the aforementioned additional circuitry (the XOR gates) between the partial product generators and the computational stages. Instead, means are provided for negating the final partial products and multiplexing them into the output of the residue adder. This technique as implemented in the multiplier of FIG. 3 has two aspects. The first is to obtain inversions of the final sum bits produced by the stages of the multiplier. This is achieved by means of inverters 71 to 75 connected from the (sum) output of the respective stage 31 to 35 to the respective following stage 60 to 64 of the residue adder.

In particular the inverters are connected to the lower input of the upper multiplexers in the stages 60 to 64.

It will be understood that the final sum bit produced by the stages arrives at the respective multiplexer two clock cycles after the arrival of the data MSB at terminal 16 (owing to the latches of terminal 16 and the sum outputs of the stages) and therefore one clock cycle after the LSB of the next data word. Thus the multiplexers, which are controlled by way of a single flip-flop (40b) from LSB control terminals 19, are effective to pass the inverted final sum bits. At all other times the inverters have no effect since their outputs are not allowed to pass by the multiplexers in the residue adder.

The second of the two aspects mentioned above requires treatment of the carry bits. This embodiment of the invention employs the final carry-save sum and carry signals together with a delayed final partial product bit to generate the correct carry bit at each stage. Thus, for example, the carry output of stage 34 is combined in an XOR gate 76, having an active-low output, which is combined in a second XOR gate 77 with the output of a flip-flop 24a, connected to the output of the partial product generator 24. The active-low output of the gate 77 is connected to an input of the lower multiplexer of stage 64 in the spill-pipe, this input being the one selected by control line 41b. This technique relies on a particular property of the truth table of a full adder, namely that summing a delayed bit product (x) with the original sum and carry signals produced by (x) gives the correct carry signal which would have been produced by 'not (x)' and the other input, had 'not (x)' been available.

The embodiment shown in FIG. 3 includes extra storage stages (such as flip-flop 24a). These may be avoided by means of the embodiment shown in FIG. 4, which is arranged generally as described with reference to FIG. 3 except for the connections of the computational stages to the residue adder. In the embodiment shown in FIG. 4 the final partial product sums (except the least significant) are fed to the spill-pipe and are inverted, either by the inverter 78 between stage 61 and the adder 60 or by inverter 79 between computational stage 31 and the adder 60. An inverter 90 is also provided in the carry path because 'false' versions of the carry signals are transferred into the PISO, in order to economise on inverters, and it is necessary to include the inverter 90 to make the signals 'true' again. The same applies to inverter 78. The extra flip-flop 91 is provided to compensate for the missing delay in the control path for the lower multiplexers, the control path for the upper multiplexers including flip-flop 40b. The difference between the paths arises because the residual carries are loaded at MSB-time and the residual sums are loaded at LSB-time.

Figure 4:
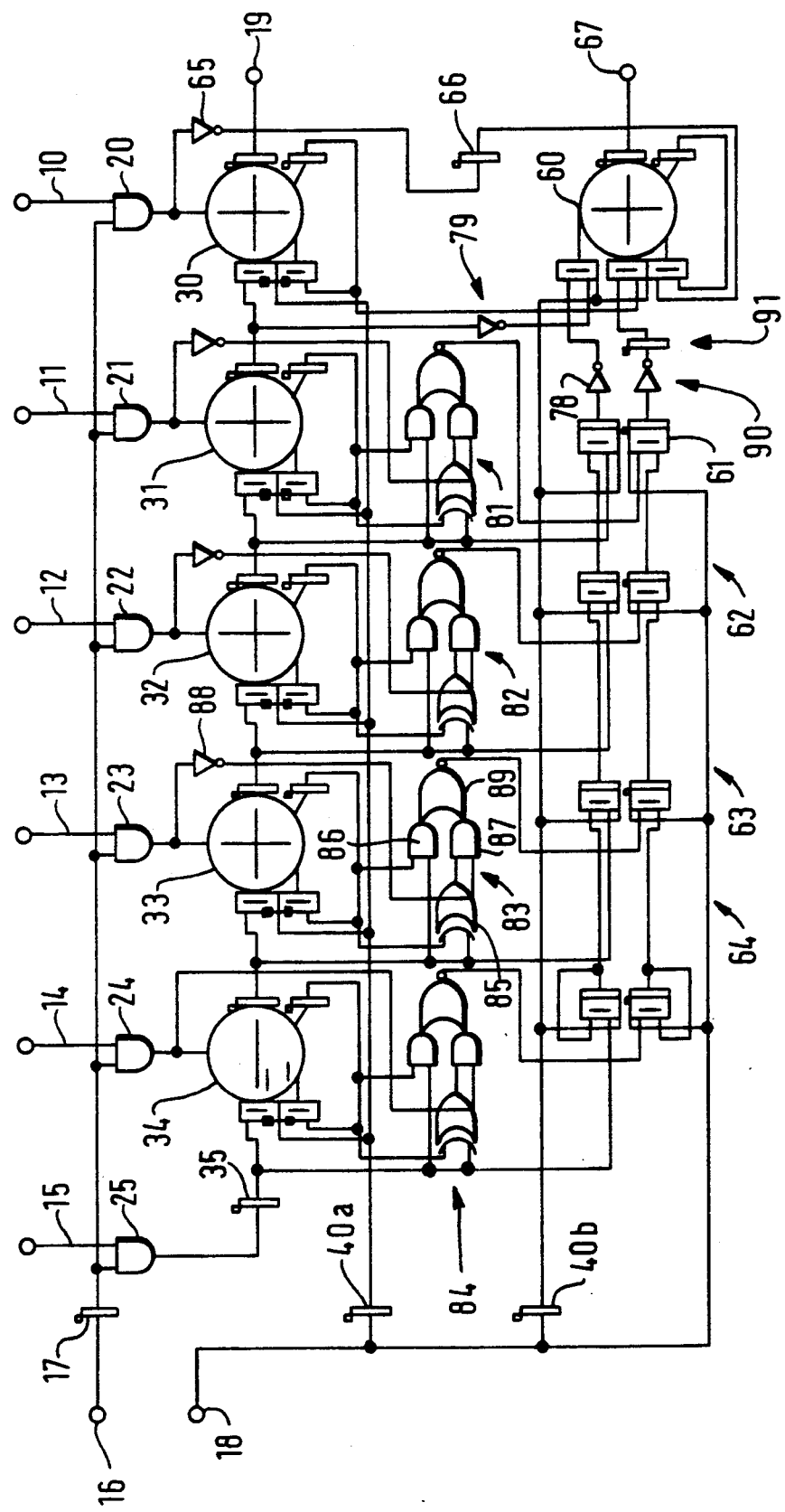
FIG. 4 illustrates schematically another embodiment of a fractional bit-serial multiplier according to the invention.

It will be understood that the duplicate carry network about to be described is only actually used once each word cycle: its output usually 'dies' at the multiplexer. In FIG. 4 it is used at MSB-time whereas the corresponding network of FIG. 3 is used at LSB-time.

The carry signals for the spill-pipe are produced by circuits 81 to 84, which duplicate the logic that produces a carry signal in the respective computational stage and are driven by an inverted version of the respective partial product. The circuits 81 to 84 are the same for each stage and only the one for stage 33 need be described. It comprises an XOR gate 85 coupled to the (sum) output of the preceding computational stage 34 and to the carry output of the associated stage 33. A first AND gate 86 is coupled to the carry output of stage 33 and to the sum output of the previous stage. A second AND gate 87 is coupled to receive the output of the XOR gate 85 and the inverted partial product of the associated partial product generator 23, being coupled to the AND gate 23 by way of inverter 88. An OR gate 89 is coupled to receive the outputs of the AND gates 86 and 87 and is coupled to the lower multiplexer of stage 63 in the spill pipe, so that it is passed at MSB-time. This is the only time the carry is required (and the only time the logic produces the correct result).

There is no explicit inverter shown between the AND gate 24 and the circuit 84. Stage 34 is a subtractor whereas the other stages are adders. If a full adder is used as a 'building block', a subtractor can be formed by inverting the minuend and the sum output (see Smith & Denyer, op. cit., page 67). In each general stage of FIG. 4, there is a duplicate carry generation network fed by the inverted output of the respective AND gate. For the subtractor there would be two inverters in series and two inverters mutually cancel.

It will be seen that in FIGS. 3 and 4 no additional circuits are provided for the final LSB partial product obtained from gate 20. This is because incrementing is both necessary and sufficient.

Incrementing is achieved in the embodiments of FIGS. 3 and 4 in the same way as in the multiplier shown in FIG. 2, viz. by means of the inverter 65 and latch 66 (in arbitrary order), which provide an inverted LSB of the final partial product for the 'free' input of the adder 60 in the spill pipe.

I claim:

1. A fractional bit-serial multiplier comprising:
   means for presenting bits of a coefficient word; a serial data input means for serially receiving a data word;
   a plurality of partial product generators each coupled to receive bits of the data word and a respective bit of the coefficient word to generate partial products, said partial products including final partial products of a most significant bit of the data word;
   a carry-save and accumulate array comprising a plurality of computational stages, each of said stages being coupled to receive a partial product from the respective partial product generator and to provide an partial product sum, the array including means for providing a first fractional output of relatively low order product terms;
   a residue adder comprising a processing pipe coupled to the said stages and including means for providing a second fractional output of relatively high order product terms;
   circuit means responsive to the partial product generators and said stages for providing partial products of negative weighting; and
   means for multiplexing the partial products of negative weight into said second fractional output in place of said final partial products.

2. A fractional bit-serial multiplier according to claim 1 wherein the processing pipe includes a plurality of multiplexing stages constituting said multiplexing means.

3. A fractional bit-serial multiplier according to claim 2 wherein said circuit means comprises, for each of a plurality of said computational stages:
   means for inverting a partial product sum from the respective computational stage;

means within the respective computational stage for producing a carry signal;

means for providing a delayed partial product from the partial products generator associated with said respective computational stage; and means for combining a partial product sum from the respective computational stage with said carry signal and said delayed partial product to provided a final partial product carry signal, said multiplexing means being operative to insert the inverted partial product sum and said final partial product carry signal into said second fractional output.

4. A fractional bit-serial multiplier according to claim 2 wherein said circuit means comprises, for each of a plurality of said computational stages:

means coupled to the respective partial product generator for producing an inverted partial product;

means responsive to said inverted partial product for generating a carry signal; and means for controlling the multiplexing means to insert the said carry signal into said second fractional output.

5. A fractional bit-serial multiplier according to claim 1 wherein the partial products include a least significant partial product and wherein the multiplier includes means for incrementing the least significant partial product.

6. A fractional bit-serial multiplier comprising:

means for presenting bits of a coefficient word;

a serial data input means for serially receiving a data word;

a plurality of partial product generators each coupled to receive bits of the data word and a respective bit of the coefficient word to generate partial products, said partial products including final partial products of a most significant bit of the data word;

a carry-save and accumulate array comprising a plurality of computational stages, each of said stages being coupled to receive a partial product from the respective partial product generator and to provide an partial product sum, the array including means for providing a first fractional output of relatively low order product terms;

a residue adder comprising a processing pipe coupled to the said stages and including means for providing a second fractional output of relatively high order product terms, said residue adder comprising a plurality of multiplexing stages;

circuit means responsive to the partial product generators and said stages for providing partial products of negative weighting; and means for controlling said multiplexing stages to insert the said partial products of negative weighting into said second fractional output in place of said final partial products.

* * * * *